United States Patent
Wu et al.

(10) Patent No.: US 7,022,784 B2
(45) Date of Patent: Apr. 4, 2006

(54) SYNTHETIC LUBRICANT COMPOSITION AND PROCESS

(75) Inventors: Margaret May-Som Wu, Skillman, NJ (US); Steven P. Rucker, Warren, NJ (US); Richard T. Spissell, National Park, NJ (US); Steven Edward Donnachie, Clayton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 44 days.

(21) Appl. No.: 10/663,567

(22) Filed: Sep. 16, 2003

(65) Prior Publication Data

US 2004/0082728 A1     Apr. 29, 2004

Related U.S. Application Data

(60) Provisional application No. 60/421,317, filed on Oct. 25, 2002.

(51) Int. Cl.
| | |
|---|---|
| *C08F 4/72* | (2006.01) |
| *C07C 5/02* | (2006.01) |
| *C07C 2/08* | (2006.01) |
| *C07C 5/22* | (2006.01) |

(52) U.S. Cl. .................. 526/170; 526/943; 526/348; 585/255; 585/254; 585/520; 585/666; 585/671

(58) Field of Classification Search ............ 526/89, 526/160, 170, 905, 90, 943, 348; 585/254–255, 585/502, 520, 671, 666
See application file for complete search history.

(56) References Cited

U.S. PATENT DOCUMENTS

| | | | | |
|---|---|---|---|---|
| 4,967,032 | A | * 10/1990 | Ho et al. ................ | 585/255 |
| 5,314,967 | A | 5/1994 | Hergenrother et al. .... | 525/337 |
| 5,705,572 | A | 1/1998 | Yi et al. ................ | 525/339 |
| 6,124,513 | A | * 9/2000 | Heilman et al. .......... | 585/12 |
| 6,548,723 | B1 | * 4/2003 | Bagheri et al. .......... | 585/517 |
| 6,660,894 | B1 | * 12/2003 | Wu et al. ............... | 585/326 |
| 2003/0055184 | A1 | * 3/2003 | Song et al. ............. | 526/160 |

FOREIGN PATENT DOCUMENTS

| | | |
|---|---|---|
| EP | 0640626 A2 | 3/1995 |
| EP | 0748653 A1 | 12/1996 |
| WO | WO 98/58972 | 12/1998 |

* cited by examiner

*Primary Examiner*—David W. Wu
*Assistant Examiner*—Rip A. Lee
(74) *Attorney, Agent, or Firm*—Charles J. Brumlik; Gary P. Katz

(57) ABSTRACT

A liquid polymer suitable for use as a lubricant base oil is produced by polymerizing ethylene and at least one alpha-olefin using a metallocene catalyst to provide a polymer which is then isomerized and hydrogenated to produce the liquid polymer.

9 Claims, No Drawings

SYNTHETIC LUBRICANT COMPOSITION AND PROCESS

This application claims the benefit of U.S. Provisional Application 60/421,317 filed Oct. 25, 2002.

FIELD OF INVENTION

The present invention relates to ethylene-alpha olefin copolymers, their method of preparation and use as a lubricating oil.

BACKGROUND OF THE INVENTION

Mechanical devices, such as internal combustion engines, require the use of a lubricant to protect mechanical parts from wear, to promote friction reduction, to inhibit rust and the like. Indeed, today automotive engines are designed to operate at higher temperatures than in the more recent past and these higher operating temperatures require higher quality lubricants.

One of the requirements for lubricants for use in currently designed engines is for higher viscosity indices (VI's) in order to reduce the effects of the higher operating temperatures on the viscosity of the engine lubricants.

Poly alpha olefins (PAO's) produced by polymerizing linear alpha olefins, especially $C_8$ to $C_{12}$ linear alpha olefins have excellent VI's and consequently have found use as lubricant base oils. Unfortunately linear alpha olefins are expensive and often in short supply thereby limiting the use of PAO's in lubricant compositions. Therefore, there is a need for synthetic base oils that are less expensive than PAO's and that have equivalent or better properties.

Olefins such as ethylene, propylene and butene are available in large quantities at relatively low cost. Thus, producing base oils from these nonomers offers the potential as a low cost alternative to PAO's. Attempts to form base oils by copolymerizing ethylene with an alpha olefin having at least 3 carbon atoms has not led to entirely satisfactory products. Typically, liquid ethylene/alpha olefin copolymers have poor pour point, cloud points and often are hazy.

Thus, there remains a need for synthetic base stocks that have high VI's, e.g., greater than about 110 and good low temperature properties such as pour point, cloud point and are haze-free.

SUMMARY OF THE INVENTION

Accordingly in one embodiment the present invention provides a process for producing a liquid polymer from ethylene and at least one alpha olefin suitable for use as a lubricant base oil comprising:

(a) polymerizing ethylene and at least one alpha olefin in the presence of a metallocene catalyst system under conditions sufficient to produce a liquid polymer;

(b) isomerizing the liquid polymer in the presence of an acidic isomerization catalyst to produce an isomerized liquid polymer; and (c) hydrogenating the isomerized liquid polymer in the presence of a hydrogenating catalyst to produce an isomerized liquid ethylene-alpha olefin polymer suitable for use as a lubricant base oil.

The novel polymers produced according to the invention may be characterized as follows:

(a) an ethylene unit content of 0.1 to 85 weight %;
(b) an alpha-olefin unit content of 15 to 99.9 weight %;
(c) a mixed head to tail and tail to head molecular structure;
(d) a pour point below about −15° C.; and
(e) a cloud point of not more than +20° C.

Other embodiments of the invention will become apparent from the description and examples which follow:

DETAILED DESCRIPTION OF THE INVENTION

In one aspect the present invention is directed toward polymers derived from ethylene and at least one alpha olefin. These polymers have physical properties which makes them particularly useful as base oils for lubricants. Although the alpha-olefins from which the copolymers are derived may have from 3 to 24 carbon atoms, advantageously the polymers are especially derived from ethylene and alpha-olefins having 3 and 4 carbon atoms. The polymers produced in accordance with the present invention have viscosity indices (VI's), pour points and cloud points that contribute to the usefulness of the polymer as a lubricant base oil.

In another aspect the invention is directed toward a process for producing an ethylene-alpha olefin polymer comprising the steps of: polymerizing ethylene and one or more alpha olefins having 3 to 24 carbon atoms in the presence of a metallocene catalyst system; isomerizing the resulting polymer in the presence of an isomerization catalyst and thereafter hydrogenating the isomerized polymer in the presence of the hydrogenation catalyst.

(a) The Polymerization Step

The copolymerization may be carried out in a batch or continuous manner, in the presence or absence of a solvent, using a metallocene catalyst system. Such catalyst systems are well known in the art and comprise a transition metal compound of Group IVb of the Periodic Table of the Elements such as Ti, Zr and Hf; and an aluminoxane co-catalyst. Specifically, useful transition metal compounds are disclosed, for example, in U.S. Pat. Nos. 5,498,809 and 6,124,513 and incorporated herein by reference.

The aluminoxane co-catalyst are polymeric aluminum compounds typically employed as co-catalysts in metallocene catalyst systems. Specific useful examples are disclosed in the aforementioned U.S. patents incorporated herein by reference.

The ethylene/alpha olefin feed will comprise 0.1 to 85 wt % of ethylene and from 15 to 99.9 wt % of at least one alpha olefin having from 3 to about 24 carbon atoms acid especially from 3 to 18 carbon atoms.

The source of the alpha olefins can be from any petrochemical plant, or from dilute alpha-olefin containing refinery streams, include butene-1 from Raffinate-2, and propylene. Most preferred is the polymerization of ethylene with butene-1 or propylene in dilute refinery stream As previously stated, the process of the present invention utilizes a metallocene catalyst system. Such metallocenes are extremely unreactive with non-terminal olefins, and terminal olefins which lack at least one hydrogen atom on the second carbon (e.g., isobutylene), at least two hydrogens on the third carbon (e.g., isopentene), or at least one hydrogen on the fourth carbon (e.g., 4,4-dimethylpentene-1). Hence, as described hereinafter, many of the components in refinery streams, such as Raffinate-2 (e.g., 2-butenes, and isobutylene) are essentially non-reactive in a metallocene system and become suitable diluents for use in the present process and these components need not be separated from the feed. Other constituents such as 1,2-butadiene may be made non-reactive by pre-saturating the double bonds with hydrogen.

When conducted in the presence of a solvent any liquid inert under reaction conditions may be used. Suitable solvents include paraffins, such butane, isobutane, pentane, hexane, Norpar solvent or Isopar solvent, etc., aromatic solvents, such as benzene, toluene, xylenes, ethylbenzenes or mixture of them. Usually the preferred solvent is toluene and butane, isobutane or paraffins that are already present in the feed.

The polymerization reaction is conducted in the temperature range of from about 0° C. to about 250° C., preferably from about 25° C. to about 200° C. in the substantial absence of molecular hydrogen and at pressures in the range of about 7 kPa to about 13.79 MPa (about 1 psi to about 2,000 psi) and preferably about 103 kPa to about 6.895 MPa (about 15 psi to about 1,000 psi).

The resulting polymer is a viscous liquid having considerable unsaturation as measured by bromine number and a substantially head to tail molecular structure as exemplified by formula I for an ethylene-butene copolymer Group III metals, such as Pt, Pd, Ni, W, etc. The modification can be carried out before or after co-extrusion with binder material. Sometimes the metal modification provides improvement in activity, sometimes it is not necessary. Typical discussion of catalysts and their preparation can be found in U.S. Pat. No. 5,885,438 which is incorporated herein by reference.

The isomerization can be carried out in fixed-bed, continuous operation, in batch type operation or in continuous stir tank operation. Generally the residence time ranges from a few seconds to up to one or two days depending on reaction temperature, catalyst activity and catalyst particle size. For economic reasons, it is prefer to have shorter residence time and yet accomplish enough isomerization to give improved properties. Usually, residence time of 10 minutes to 20 hours residence time is suitable.

The isomerization is conducted at temperatures in the range of about 100° C. to about 400° C. and preferably at about 125° C. to about 300° C. and at pressures of about 0 kPa to about 13.79 MPa (about 0 psi to about 2,000 psi) and preferably about 35.5 kPa (about 15 psi) (atmospheric pressure) to about 6.895 MPa (about 1,000 psi).

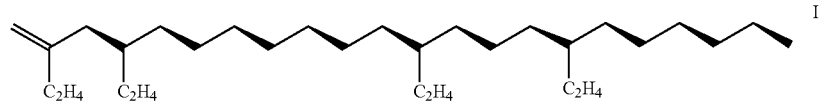

I (b) The Isomerization Step

The liquid polymer is next subjected to isomerization. Isomerization, of course, results in the rearrangement of the molecular structure and is achieved in the substantial absence of hydrogen and in the presence of an isomerization catalyst. Any known acid isomerization catalyst may be used. The acid catalyst can be the typical homogeneous acid catalysts, such as $AlCl_3$, $BF_3$ (halides of Group IIIA) or modified form of these catalysts, or other typical Friedel-Crafts catalysts, such as the halides of Ti, Fe, Zn, and the like. The acid catalyst can be solid metals or metal oxides or their mixture of Group IVB, VB, VIB and Group III; or the metal oxides or mixed oxides of Group IIA to VA; or other mixed metal oxides such as $WO_x/ZrO_2$ type catalyst, or solid natural or synthetic zeolites, layered material, crystalline or amorphous material of silica, alumina, silicoaluminate, aluminophosphate, aluminumsilicophosphate, etc. These solid acidic catalysts may contain other Group VIII metals such as Pt, Pd, Ni, W, etc., as promoters. Generally, it is preferred to use a solid, regenerable catalyst for process economic reason and for better product quality. The preferred catalysts include: ZSM-5, ZSM-11, ZSM-20, ZSM-22, ZSM-23, ZSM-35, ZSM-48, zeolite beta, MCM22, MCM49, MCM56, SAPO-11, SAPO-31, zeolite X, zeolite Y, USY, REY, M41S and MCM-41, $WO_x/ZrO_2$, etc. The solid catalyst can be used by itself or co-extruded with other binder material. Typical binder material includes silica, alumina, silicoalumina, titania, zirconia, magnesia, rare earth oxides, etc. The solid acidic catalyst can be further modified by (c) The Hydrogenation Step The isomerized polymer is next subjected to hydrogenation in the presence of a hydrogenation catalyst. Hydrogenation catalysts are well known in the art and include Group III metals supported on inert supports such as carbon, kieselgel, clay, alumina, crystalline microporous material and the like. The commonly used hydrogenation catalyst is Ni on kieselgel or Pt or Pd on alumina.

Hydrogenation is conducted at temperatures in the range of about 100° C. to about 350° C., preferably about 150° C. to about 250° C., and at hydrogen pressures of about 103 kPa to about 13.79 MPa (about 15 psi to about 2,000 psi), preferably about 138 kPa to about 6.895 MPa (about 20 psi to about 1,000 psi). Generally, the isomerized polymer is hydrogenated to give a bromine number of less than 2. In some special applications where it is desirable to produce a product with a bromine number less than 0.1, more severe hydrogenation conditions or a more active catalyst may be necessary. As is known, a lower bromine number for the polymer typically is beneficially for improved oxidative stability.

The isomerized and hydrogenated polymer is characterized by a mixed head to tail and tail to head as exemplified by formula II for an ethylene-butene copolymer. As will be appreciated, if other alpha-olefins were used in the polymerization step, the $C_2H_4$ group in the structure will correspond to the other alpha-olefins.

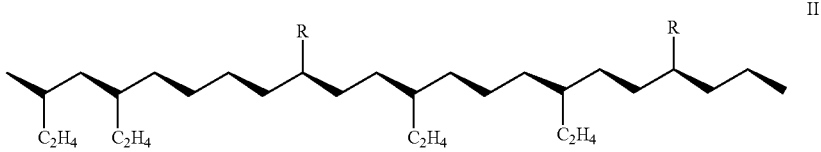

II

In this structure, the Rs are alkyl groups which are mostly $CH_3$ groups, with some being ethyl, n-propyl or iso-propyl groups and in much lower quantity. These extra alkyl groups result from the isomerization step.

c) The Polymer Products

The isomerized polymer products useful as lubricant base oils typically will have number-averaged molecular weight in the range of about 200 to about 20,000. The molecular weight distribution ranges from 1.01 to 4, most common distribution range from 1.2 to 3.0. These lube base oil have 100° C. viscosities ranging from $2 \times 10^{-6}$ to $5 \times 10^{-3}$ m$^2$/sec (2 to 5,000 cSt). The most commonly used viscosity range is from $3.5 \times 10^{-6}$ to $1 \times 10^{-3}$ m$^2$/sec (3.5 cSt to 1,000 cSt. In general the products also will have VI's greater than about 100, typically greater than 120, pour points below about 0° C. for example from below −15° C. and cloud points below about 25° C. and preferably less than 20° C.

EXAMPLE 1

This example illustrates the copolymerization step of the present invention.

In this example polymer grade ethylene, polymer grade 1-butene and polymer grade iso-butane solvent were charged into a 200 gallon reactor after purification through molecular sieve and treatment by injecting 50 ppm tri-t-butylaluminum. The feed rates for ethylene, 1-butene and iso-butane were 26, 54, and 128 kg/hour (58, 120 and 283 lb/hour), respectively. A catalyst solution, containing $5 \times 10^{-6}$ g-mole/liter of dimethylsilylbis (4,5,6,7 tetrahydro-indenyl) zirconium dichloride and methylaluminoxane of 1/400 Zr/Al molar ratio in toluene, was charged into the reactor at 13.5 mL/minute. The reactor temperature was maintained between 98 and 101° C. (209 and 214° F.), pressure 2.00–2.07 MPa (290–300 psi) and average residence time 1 hour. The crude reaction product was withdrawn from the reactor continuously and washed with 0.4 wt % sodium hydroxide solution followed with a water wash. A viscous liquid product was obtained by devolitalization to remove iso-butane solvent, light stripping at 66° C./30 kPa (150° F./5 psig) followed by deep stripping at 140° C./1 milliTorr. This viscous liquid was used for further experiments.

EXAMPLES 2 TO 5

These examples illustrate the isomerization and hydrogenation steps of the present invention and the increased branchiness achieved thereby.

In Example 2, one hundred grams of the viscous liquid prepared in Example 1 was mixed with two grams of a powdered platinum (0.6 wt %) modified ZSM48 catalyst and heated to 260° C. under nitrogen atmosphere for 16 hours. The catalyst was then filtered off. The filtrate then mixed with 2 wt % of a 50% nickel on kieselgel catalyst, heated to 200° C. under 5.52 MPa (800 psi) H$_2$ pressure for 16 hours. The hydrofinished viscous liquid, after separation from the catalyst, was distilled at 150° C., <1 milliTorr vacuum for two hours to remove any light ends, usually less than 3%.

In Example 3 to 5 the procedure of Example 2 was followed except the isomerization was conducted at 275° C., 300° C. and 320° C. respectively.

The properties of the final lube product for Examples 2 to 5 are listed in Table 1.

Comparative Example 1

This example illustrates that hydrogenation of the copolymer without isomerization results in a product with inadequate cloud point.

In the comparative example, a 100 gram sample of the residual viscous liquid was hydro-finished at 200° C., 5.52–8.274 MPa (800–1200 psi) H$_2$ pressure with 2 wt % Ni-on-Kieselguhr catalyst for eight hours. The finished lube base stock contains 44 wt % ethylene and has the following properties: 100° C. Kv=$1.499 \times 10^{-4}$ m$^2$/sec (149.9 cSt), 40° C. Kv=$2.4184 \times 10^{-3}$ m$^{2/sec}$ (2418.4 cSt), VI=164, Pour point=−24° C., Cloud point=+45° C. The properties of this material are given in Table 1.

TABLE 1

| | Example No. | | | | |
| --- | --- | --- | --- | --- | --- |
| | Comp. 1 | 2 | 3 | 4 | 5 |
| Isom. Temperature, ° C. | Not applicable | 260 | 275 | 300 | 320 |
| 100° C. Visc. cSt | 149.9 | 147.4 | 155.0 | 160.1 | 157.4 |
| 40° C. Visc. cSt | 2418.4 | 2279 | 2466 | 2618 | 2603 |
| VI | 164 | 167 | 167 | 166 | 164 |
| Pour Point, ° C. | −24 | −24 | −24 | −23 | −23 |
| Cloud Point, ° C. (a) | 42 | −7 | −7 | −10 | −11 |
| C1 branch/1,000° C. | 10.2 | 10.5 | 10.5 | 11.3 | 24.0 |
| C3 branch/1,000° C. | 1.0 | 1.3 | 1.5 | 2.5 | 5.4 |
| C4 branch/1,000° C. | 2.7 | 2.7 | 2.6 | 3.0 | 4.4 |
| C5& + branch/1,000° C. | 5.5 | 5.8 | 6.3 | 6.3 | 7.2 |
| (CH2)x at 29.9 ppm | 96.4 | 93.7 | 94.1 | 94.7 | 86.0 |
| Total short chain branches (b) | 19.4 | 20.3 | 20.9 | 23.1 | 41.0 |

(a) - measured by ASTM D2500 method
(b) - include $C_1$ to $C_5$ and higher branches

EXAMPLE 6

This example further illustrates the process of the invention.

In this example a sample of the viscous liquid prepared in Example 1 was fed from a high pressure syringe pump at 2 mL/hour into a fixed bed micro-reactor, containing two-grams of a platinum modified ZSM48 catalyst, heated to 285° C. and pressurized to 5.52 MPa (800 psi). The effluent, together with hydrogen gas of 8.33 mL/hour, was then fed through the second fixed bed reactor, containing four grams of a 50 wt % nickel on Kieselguhr catalyst at 250° C. and 5.52 MPa (800 psi). The final product from the reactor system was collected every 48 hours. The liquid crude product was then distilled at 150° C./<1 milliTorr vacuum for two hours to remove light ends. Usually, the lube yields were very high >95% and less than 5 wt % of distillates was collected. The lube product properties and compositions were summarized in Table 2. These data demonstrated that the cloud point of the sample was reduced from 42° C. to less than 15° C. by treatment with Pt-ZSM48.

TABLE 2

|  | Starting Material | Products | | | | | |
|---|---|---|---|---|---|---|---|
|  |  | 1 | 2 | 3 | 4 | 5 | 6 |
| Days on Stream |  | 4 | 8 | 12 | 16 | 20 | 22 |
| Lube yield by distillation, wt % |  | 97.1 | 96.8 | 96.6 | 94.6 | 95.3 | 96.2 |
| Lube Properties |  |  |  |  |  |  |  |
| 40° C. Visc, cSt | 2418.4 | 2609 | 2507 | 2549 | 2583.67 | 2548.42 | 2345.89 |
| 100° C. Visc, cSt | 149.85 | 161.3 | 155.0 | 158.3 | 164 | 163.5 | 152.16 |
| VI | 164 | 161.3 | 165.0 | 166.5 | 166 | 167 | 165 |
| Pour Point, ° C. | −24 | −22.3 | −22.9 | −22.3 | −23 | −23.5 | −23.1 |
| Cloud Point, ° C. | +42 | <15 | <15 | <15 | <15 | <15 | <15 |
| Product Appearance | Hazy | Clear | Clear | Clear | Clear | Clear | Clear |

EXAMPLE 7

An ethylene-butene co-polymer was prepared by charging a mixed butene feed containing 60 wt % 1-butene and 40 wt % 2-butene at 100 mL/hour, hydrogen at 20.5 mL/minute and ethylene at 24 gram/hour into a 600 mL autoclave containing a catalyst solution of 55 mg zirconocene dichloride, 0.4 gram methylaluminoxane and 50 gram toluene, and cooled in a water bath at 20° C. The feeds were discontinued after three hours. After 2 hours of reaction at 30° C., the reaction was quenched with water and alumina. The catalyst and any solid was removed by filtration. The viscous liquid product was isolated in distillation at 140° C./0.1 milliTorr for 2 hours to remove any light ends. This fluid was hydrogenated to remove any unsaturation. After hydrogenation the fluid had the following properties: 100° C Kv.=$1.192 \times 10^{-5}$ m$^2$/sec (11.92 cSt), 40° C. Kv=$7.281 \times 10^{-5}$ m$^2$/sec (72.81 cSt) and pour point=−22° C. In contrast, when the unhydrogenated polymer is treated with 2 wt % Pt-ZSM 48 catalyst at 275° C. followed by hydrogenation in a similar manner as Example 2 the resulting fluid had the following properties: 100° C. Kv=$1.497 \times 10^{-5}$ m$^2$/sec (14.97 cSt), 40° C. Kv=$1.098 \times 10^{-4}$ m$^2$/sec (109.8 cSt) and pour point=−45° C. This data shows that the polymer after zeolite treatment has a significantly improved pour point and is haze-free.

What is claimed is:

1. A method for forming an ethylene-alpha olefin polymer suitable for use as a lubricant base oil comprising:
   (a) polymerizing an olefin feed containing ethylene and at least one alpha-olefin in the presence of a metallocene catalyst system under conditions sufficient to produce a liquid polymer;
   (b) isomerizing the liquid polymer in the substantial absence of molecular hydrogen and in the presence of an acidic isomerization catalyst to produce an isomerized liquid polymer; and
   (c) hydrogenating the isomerized liquid polymer in the presence of a hydrogenation catalyst to produce an ethylene-alpha olefin polymer suitable for use as a lubricant base oil.

2. The method of claim 1 wherein the feed comprises 0.1 to 85 wt % ethylene and 15 to 99.9 wt % of at least one alpha olefin.

3. The method of claim 2 wherein the alpha olefin has from 3 to about 24 carbon atoms.

4. The method of claim 2 wherein the polymerizing is conducted in the temperature range of from about 0° C. to about 250° C. in the substantial absence of molecular hydrogen and at pressures in the range of about 7 kPa (about 1 psi) to about 13.79 MPa (about 2,000 psi).

5. The method of claim 4 wherein the isomerizing is conducted in the substantial absence of molecular hydrogen at temperatures from about 100° C. to about 400° C. and pressures from about 7 kPa (about 1 psi) to about 13.79 MPa (about 2,000 psi).

6. The method of claim 4 wherein the hydrogenating is conducted at temperatures in the range of about 100° C. to about 350° C. and at pressures of about 103 kPa (about 15 psi) to about 13.79 MPa (about 2,000 psi).

7. The method of claim 6 wherein the alpha olefin has 3 or 4 carbon atoms.

8. The method of claim 6 wherein the olefin feed contains additional olefins that are substantially inert under said polymerizing condition.

9. The method of claim 6 wherein the hydrogenating is conducted under conditions sufficient whereby the polymer has a bromine number less than 2.

* * * * *